United States Patent [19]

Olson

[11] Patent Number: 4,639,028

[45] Date of Patent: Jan. 27, 1987

[54] HIGH TEMPERATURE AND ACID RESISTANT WAFER PICK UP DEVICE

[75] Inventor: Donald M. Olson, Scottsdale, Ariz.

[73] Assignee: Economic Development Corporation, Phoenix, Ariz.

[21] Appl. No.: 670,627

[22] Filed: Nov. 13, 1984

[51] Int. Cl.[4] .......................... B05G 13/02; B65G 7/12
[52] U.S. Cl. ...................................... 294/34; 294/362; 294/103.1
[58] Field of Search ..................... 294/103.1, 31.1, 33, 294/99.1, 34, 15, 16, 26, 74, 1.1; 81/355, 362, 356; 100/266

[56] References Cited

U.S. PATENT DOCUMENTS 2,780,486  2/1957  Loughlin ............................... 294/34
4,410,209  10/1983  Traponi ................................. 294/34

Primary Examiner—James B. Marbert
Attorney, Agent, or Firm—Harry M. Weiss & Associates

[57] ABSTRACT

A wafer pick up device is presented which may be used to pick up silicon wafers used in the semiconductor industry during the various stages of processing. Since the pick up device is made out of a high temperature and acid resistant material, it may be used to pick up hot wafers or to handle wafers being subjected to an acid bath. The device uses a sliding plate which slidably engages a closure channel and base plate. Two wafer holding pins fastened to an actuator bar portion of the sliding plate are used to engage a portion of the outer periphery of a wafer. A curved V-shaped groove at one end of the base plate engages another portion of the outer periphery of the wafer. The distance between the waver holding pins and curved V-shaped groove can be adjusted so that the wafer may be picked up by engaging the primary flat surface at the outer periphery of the wafer if desired. The actuator bar portion is wide enough to provide structural rigidity and facilitate holding the wafer securely in place. An operator may grasp extensions located on top of the device in order to move the sliding plate forward.

18 Claims, 6 Drawing Figures

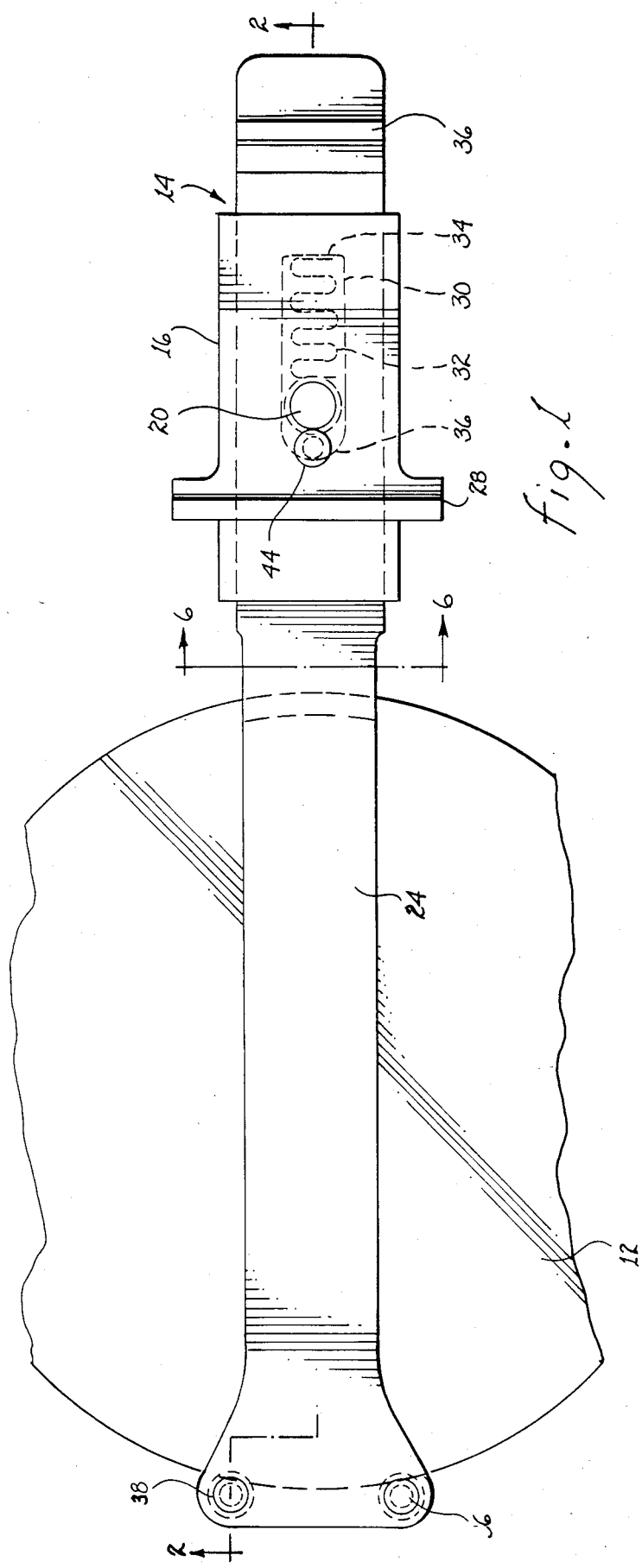
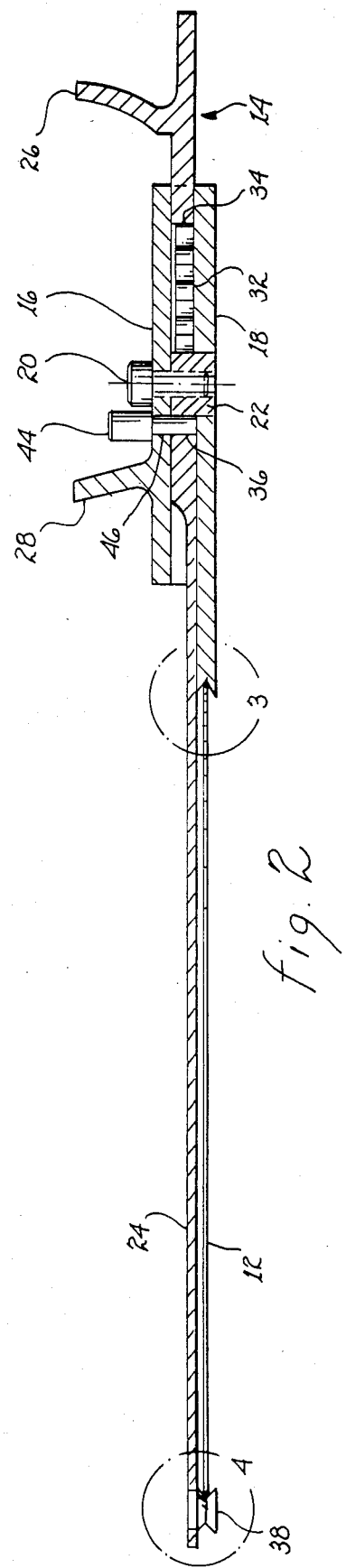
fig. 1
fig. 2

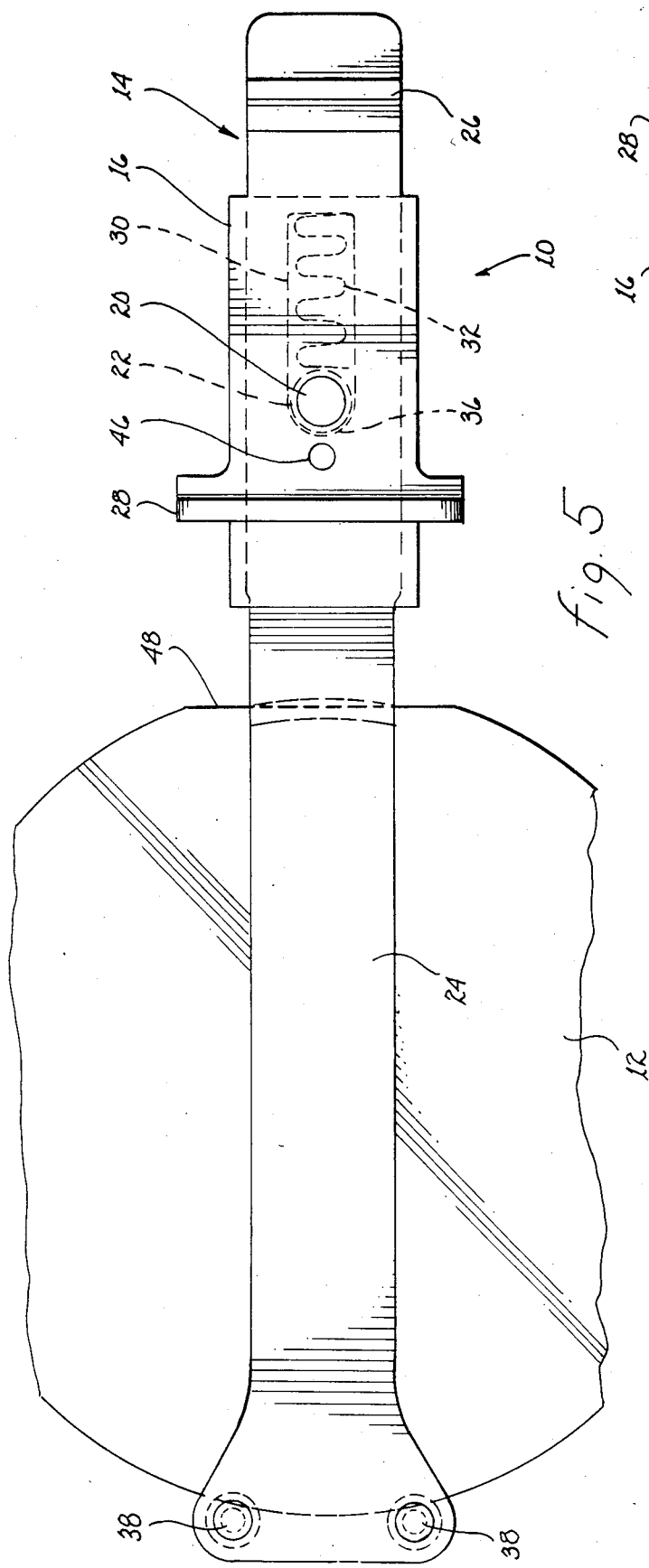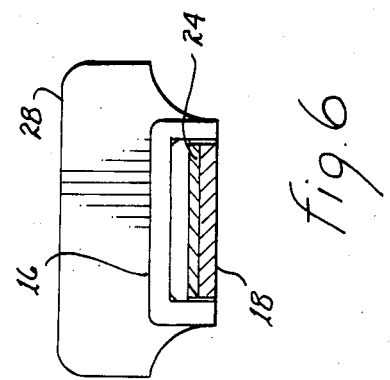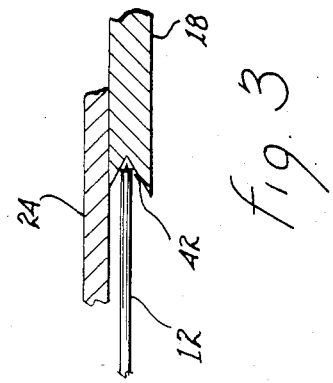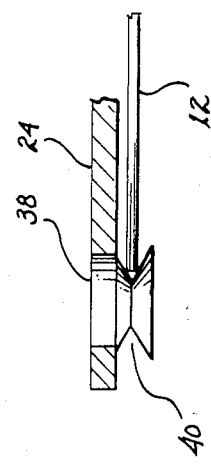

HIGH TEMPERATURE AND ACID RESISTANT WAFER PICK UP DEVICE

BACKGROUND OF THE INVENTION

This invention relates generally to wafer handling devices and, more particularly, to an improved high temperature and acid resistant wafer pick up device which may be used for handling wafers during the various stages of processing.

Silicon wafers are typically used during processing of semiconductors. Such wafers can be easily damaged during processing unless they are handled with extreme care. Damage may occur during handling of the wafers for inspection purposes. For example, damage can occur if the face of a wafer is touched during inspection. Obviously, the wafers will be damaged if they are dropped. As a result, any device used for handling the wafers should be capable of securely gripping each wafer at its outer periphery.

In addition, wafers are often subjected to acid baths during processing. As such, any pick up device used for the purpose of handling wafers during processing should be acid resistant.

Moreover, an operator may have to pick up a wafer which is lying on a hot surface during certain stages of processing. In order to pick up the wafer, it is necessary that the operator's fingers do not come into contact with any part of the hot surface. Therefore, the operator must be able to grasp and operate a pick up device without touching any part of the hot surface.

During processing, wafers may be subjected to temperatures in the range of 300° C. to 1000° C. Since the pick up device may be used to pick up hot wafers, it should be made out of a material which will not be damaged by high temperatures.

Accordingly, there is a need for a high temperature and acid resistant device which may be used for the purpose of picking up wafers such as those used in the semiconductor industry during the various stages of processing. The device should allow an operator to easily pick up a wafer without touching the face of the wafer and should securely hold the wafer in place until it is released.

SUMMARY OF THE INVENTION

It is an object of this invention to provide an improved high temperature and acid resistant wafer pick up device.

It is still another object of this invention to provide an improved pick up device which may be used for the purpose of picking up wafers such as those used in the semiconductor industry during the various stages of processing.

It is still another object of this invention to provide an improved pick up device capable of picking up a wafer without touching the face of the wafer.

It is still another object of this invention to provide an improved pick up device which will securely hold a wafer in place until it is released.

It is still another object of this invention to provide an improved pick up device which is acid resistant for the purpose of holding a wafer while it is being subjected to an acid bath.

It is still another object of this invention to provide an improved pick up device which allows an operator to pick up a hot wafer or a wafer lying on a hot surface without touching the surface with his or her fingers.

In accordance with one embodiment of this invention, a wafer pick up device is disclosed which may be used to pick up silicon wafers used in the semiconductor industry during the various stages of processing. Since the pick up device is made out of a high temperature and acid resistant material, it may be used to pick up hot wafers or to handle wafers being subjected to an acid bath. The device uses a sliding plate which slidably engages a closure channel and base place. Two wafer holding pins fastened to an actuator bar portion of the sliding plate are used to engage a portion of the outer periphery of a wafer. A curved V-shaped groove at one end of the base plate engages another portion of the outer periphery of the wafer. The distance between the wafer holding pins and curved V-shaped groove can be adjusted so that the wafer may be picked up by engaging the primary flat surface at the outer periphery of the wafer if desired. The actuator bar portion is wide enough to provide structural rigidity and facilitate holding the wafer securely in place. An operator may grasp extensions located on top of the device in order to move the sliding plate forward. A spring is used to return the sliding plate to its original position after the extensions are released. The closure channel and base plate are releasably held together by a screw threaded into a stop post.

The foregoing and other objects, features and advantages of this invention will be apparent from the following, more particular, description of the preferred embodiments of the invention as illustrated in the accompanying drawings.

BRIEF DESCRIPTION OF THE DRAWINGS

FIG. 1 is a top plan view of a wafer pick up device showing how a wafer may be picked up by engaging the outside periphery of the wafer;

FIG. 2 is a cross-sectional view of the pick up device and wafer taken along line 2—2 in the direction of the arrows shown in FIG. 1;

FIG. 3 is an enlarged cross-sectional view showing in greater detail how a portion of the outside periphery of the wafer (circled in FIG. 2) engages a base plate;

FIG. 4 is an enlarged cross-sectional view showing in greater detail how another portion of the outside periphery of the wafer (circled in FIG. 2) engages the wafer holding pins;

FIG. 5 is a top plan view of the wafer pick up device showing how a wafer may be picked up by engaging the primary flat surface of the wafer; and FIG. 6 is a cross-sectional view of the pick up device taken along line 6—6 in the direction of the arrows shown in FIG. 1.

DESCRIPTION OF THE PREFERRED EMBODIMENTS

FIG. 1 is a top plan view of a pick up device, generally designated by reference number 10, which may be used for the purpose of picking up a wafer 12 such as a silicon wafer used in the semiconductor industry. Referring to FIGS. 1 and 2, a sliding plate 14 slidably engages a closure channel 16 and a base plate 18. The closure channel 16 and base plate 18 are coupled together by a screw 20 which is threaded into a stop post 22 fastened to the base plate 18. A flat actuator bar portion 24 of the sliding plate 14 extends past the closure channel 16.

As shown by dotted lines in FIG. 1, the sliding plate 14 has an aperture 30 passing through it. A spring 32 is fit into the aperture 30 and held in place between the closure channel 16 and base plate 18. When assembled, one end of the spring 32 rests against end 34 of the aperture 30 and the other end of the spring presses against the stop post 22. The sliding plate 14 has an extension 26 protruding in an upward direction. Likewise, extension 28 protrudes upward from closure channel 16. Extensions 26 and 28 are integral parts of the sliding plate 14 and closure channel 16, respectively.

The extensions 26 and 28 are angled so that an operator may easily grasp extension 26 with his or her thumb and extension 28 with the other fingers of the operator's hand. As such, sliding plate 14 may be slid forward toward extension 28 by grasping both extensions 26 and 28 with the operator's fingers and forcing the plate 14 forward using the operator's thumb. FIG. 6 shows how the base plate 18 and sliding plate 14 fit inside the closure channel 16. Note that extension 28 is wide enough to fit the fingers of an operator. The spring 32 is compressed as the sliding plate 14 is moved forward. As a result, the sliding plate 14 returns to its original position after the extensions 26 and 28 are released. It is important to note that the actuator bar portion 24 is moved forward as the extension 26 of sliding plate 14 is pushed forward.

FIG. 4 is an enlarged view of one of two wafer holding pins 38 fastened to the actuator bar 24. Each wafer holding pin 38 has an annular V-shaped groove 40. FIG. 3 shows an enlarged view of one end of the base plate 18. Note that the base plate has a curved V-shpaed groove 42 at its end. The V-shaped grooves 40 and 42 are used to engage the outer periphery of the wafer 12 as shown in FIGS. 1 through 5.

FIG. 1 shows how the pick up device 10 may be used to pick up a wafer 12 by engaging the outer periphery (outside diameter) of the wafer 12. In this case, the V-shaped grooves 40 and 42 operably engage the outside diameter of the wafer 12 holding it securely in place. As shown in FIGS. 1 and 2, a shouldered pin 44 fits into an aperture 46 passing through the closure channel 16. The shouldered pin 44 extends into the aperture 30 so that end 36 of the aperture 30 is biased against pin 44 by the force exerted by spring 32 when pressure is no longer applied to extension 26 by an operator's thumb.

The pick up device may be used to pick up a wafer by first pushing the actuator bar portion 24 forward using extensions 26 and 28 until the distance between V-shaped grooves 40 and 42 exceeds the diameter of the wafer 12. Then, the sliding plate 14 is allowed to return to its original position under the force of the spring 32 so that end 36 is biased against pin 44 and the V-shaped grooves 40 and 42 operably engage the outside diameter of the wafer 12. The aperture 46 is located with respect to the sliding plate 14 and base plate 18 so that the V-shaped grooves 40 and 42 will operably engage the wafer 12 securely holding it in place without placing too much force on the wafer 12.

The actuator bar portion 24 has two wafer holding pins 38 which securely hold the wafer 12 in place and help to distribute any load applied to the outer diameter of the wafer 12. It is important to note that the actuator bar portion 24 has a generally rectangular shape which adds structural rigidity and facilitates holding the wafer 12 in place.

Wafers used in the semiconductor industry typically have primary and secondary flat surfaces at their outer periphery. FIG. 5 shows how a wafer 12 may be picked up by engaging a primary flat surface of the wafer. In this case, the shouldered pin 44 is removed from aperture 46. Note that V-shaped grooves 40 and 42 are used to engage the outside diameter and primary flat surface 48 of the wafer securely holding it in place and minimizing forces acting on the wafer 12. As such, the pick up device 10 can be used with or without the shouldered pin 44.

The closure channel 16, sliding plate 14 and base plate 18 are coupled together by screw 20 which is threaded into stop post 22. As a result, screw 20 may be removed allowing the spring 32 to be replaced if necessary. This feature increases the useful working life of the pick up device 10.

Extensions 26 and 28 are located at the top of the pick up device 10. Therefore, an operator can grasp the extensions 26 and 28 without touching the surface upon which a wafer is lying. This feature is particularly advantageous when the wafers are located on a hot surface.

Because the pick up device may come into contact with hot wafers, hot surfaces or with acids when the wafers are subjected to acid baths, the closure channel 16, sliding plate 14, base plate 18, wafer holding pins 38, shouldered pin 44, screw 20 and stop post 22 are preferably made out of a high temperature and acid resistant material such as alpha silicon carbide (SiC), silicon nitrade ($Si_3N_4$) and aluminum oxide ($Al_2O_3$). However, the screw 20 may be made out of metal if desired. Also, it is preferable that the wafer holding pins 38 and stop post 22 are fastened to the actuator bar portion 24 and base plate 18, respectively, by using a Fritt Sinter process which effectively fuses the materials together.

While the invention has been particularly shown and described in reference to preferred embodiments thereof, it will be understood by those skilled in the art that changes in form and details may be made therein without departing from the spirit and scope of the invention.

I claim:

1. A device used for picking up wafers, comprising:
   a closure channel having an aperture and a first extension protruding upward from the top surface of said closure channel;
   a base plate including first groove means for operably engaging one of said wafers;
   sliding plate means located between said closure channel and said base plate for operably engaging said one of said wafers, said sliding plate means having an aperture and a second extension protruding upward from the top surface of said sliding plate means, and said sliding plate means slidably engaging said closure channel and said base plate, said sliding plate means having a plurality of grasping extensions located on the top of the end thereof;
   spring means located within said aperture of said sliding plate means for returning said sliding plate means to an original position after said sliding plate means has been moved to another position; and
   coupling means for releasably coupling said closure channel, said base plate, said sliding plate means and said spring means together, said coupling means having a plurality of holding pins for securely holding said wafers.

2. The device of claim 1 wherein said sliding plate means includes second groove means for operably engaging said one of said wafers.

3. The device of claim 2 further comprising adjusting means operably engaging said aperture in said closure channel for determining a distance between said first and second groove means in order to operably engage said one of said wafers.

4. The device of claim 3 wherein said first groove means includes a curved V-shaped groove and said second groove means includes two wafer holding pins having annular V-shaped grooves.

5. The device of claim 4 wherein said coupling means includes a stop post and screw and said adjusting means includes a shouldered pin, said stop post being fastened to said base plate.

6. The device of claim 3 wherein said closure channel, said base plate, said sliding plate means, said coupling means and said adjusting means are made of a material selected from the group consisting of alpha silicon carbide, silicon nitride and aluminum oxide.

7. A high temperature and acid resistant wafer pick up device, comprising:
a closure channel;
base plate means operably coupled to said closure channel for operably engaging a first portion of the outer periphery of a wafer;
sliding plate means slidably engaging said closure channel and said base plate means for operably engaging a second portion of the outer periphery of said wafer, said sliding plate means having a plurality of grasping extensions located on the top of the end thereof;
spring means operably coupled to said sliding plate means for returning said sliding plate means to a first position after said sliding plate means has been moved to a second position; and
grasping means located on top of said closure channel and said sliding plate means for moving said sliding plate means from said first position to said second position, said coupling means having a plurality of holding pins for securely holding said wafers.

8. The high temperature and acid resistant wafer pick up device of claim 7 further comprising coupling means for releasably coupling said closure channel, said base plate means, said sliding plate means and said spring means together.

9. The high temperature and acid resistant wafer pick up device of claim 8 further comprising adjusting means for determining a distance that said sliding plate means moves relative to said base plate means.

10. The high temperature and acid resistant wafer pick up device of claim 9 wherein said closure channel, said base plate means, said sliding plate means, said coupling means and said adjusting means are made of a material selected from the group consisting of alpha silicon carbide, silicon nitride and aluminum oxide.

11. A wafer pick up device comprising:
a generally U-shaped closure channel member;
a flat base plate member releasably coupled to said closure channel member, said flat base plate member having a curved V-shaped groove for operably engaging a wafer; and
sliding plate means slidably engaging said closure channel member and said flat base plate member for operably engaging said wafer, said sliding plate means including a flat generally rectangular-shaped plate portion capable of furnishing structured rigidity so that said wafer is securely held in place, said adjusting means for establishing a distance that said sliding plate means moves with respect to said flat base plate member, said adjusting means comprises a shoulder pin.

12. The wafer pick up device of claim 11 further comprising spring means operably coupled to said sliding plate means for returning said sliding plate means to a first position after said sliding plate means has been moved to a second position.

13. The wafer pick up device of claim 12 wherein said sliding plate means further includes two wafer holding pins fastened to said flat generally rectangular-shaped plate portion, said two wafer holding pins having an annular V-shaped groove for operably engaging said wafer.

14. The wafer pick up device of claim 13 wherein said closure channel member and said sliding plate means have extensions protruding in an upward direction, said extensions being angled so that an operator can easily grasp said extensions with said operator's fingers.

15. The wafer pick up device of claim 14 wherein said closure channel member, said flat base plate member, said spring means and said sliding plate means are removably coupled together by a screw threaded into a stop post fastened to said flat base plate member.

16. The wafer pick up device of claim 15 wherein said closure channel member, said flat base plate member, said sliding plate means, said shouldered pin, said screw and said stop post are made of a material selected from the group consisting of alpha silicon carbide, silicon nitride and aluminum oxide.

17. The wafer pick up device of claim 16 wherein said two wafer holding pins are fastened to said sliding plate means by a Fritt Sinter process.

18. The wafer pick up device of claim 17 wherein said stop post is fastened to said flat base plate member by a Fritt Sinter process.

* * * * *